United States Patent
Yorita et al.

(10) Patent No.: US 6,725,834 B2
(45) Date of Patent: Apr. 27, 2004

(54) IGNITION SYSTEM WITH ION CURRENT DETECTING CIRCUIT

(75) Inventors: Hiroshi Yorita, Kariya (JP); Masatoshi Ikeda, Hazu-gun (JP); Makoto Toriyama, Chiryu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 83 days.

(21) Appl. No.: 10/116,359

(22) Filed: Apr. 5, 2002

(65) Prior Publication Data

US 2002/0144539 A1 Oct. 10, 2002

(30) Foreign Application Priority Data

Apr. 5, 2001 (JP) ........................................ 2001-107097
Jan. 30, 2002 (JP) ........................................ 2002-022348

(51) Int. Cl.[7] ............................. F02P 5/152; F02P 17/04
(52) U.S. Cl. .................. 123/406.29; 123/637; 73/35.08
(58) Field of Search ........................ 123/406.26, 406.29, 123/406.34, 406.37, 594, 620, 637; 73/35.08; 324/402, 399

(56) References Cited

U.S. PATENT DOCUMENTS 5,801,534 A * 9/1998 Hohner et al. ............... 324/399
5,992,386 A * 11/1999 Nytomt et al. ........... 123/406.37
6,075,366 A * 6/2000 Yasuda ....................... 73/35.08
6,186,129 B1 * 2/2001 Butler, Jr. ..................... 123/620

FOREIGN PATENT DOCUMENTS

JP          11-22615          1/1999

* cited by examiner

Primary Examiner—Henry C. Yuen
Assistant Examiner—Arnold Castro
(74) Attorney, Agent, or Firm—Nixon & Vanderhye P.C.

(57) ABSTRACT

An ignition system has an ignition circuit and an ion current detecting circuit. The ignition circuit has an ignition coil that has relatively low inductance of about less than 10 henries (H) because it is used in conjunction with a separate energy accumulating coil, and a driving circuit for a multi-spark ignition sequence. The ion current detecting circuit detects a second harmonic component of engine knock. The components of the system are designed so that the resonance frequency of an ion current path substantially coincides with the second harmonic frequency component, so that the Q-value of the ion current path is greater than 1. As a result, it is possible to improve knock detecting accuracy.

17 Claims, 4 Drawing Sheets

IGNITION SYSTEM WITH ION CURRENT DETECTING CIRCUIT

CROSS REFERENCE TO RELATED APPLICATION

This application is based on Japanese Patent Applications No. 2001-107097 filed on Apr. 5, 2001, and No. 2002-22348 filed on Jan. 30, 2002 the contents of which are incorporated herein by reference.

BACKGROUND OF THE INVENTION

1. Field of the Invention

The present invention relates to an ignition system for igniting the air/fuel mixture in a combustion chamber. Especially, the ignition system has an ion current detecting circuit for detecting an ion-current.

2. Description of Related Art

JP-A-11-22615 discloses an ignition system that has an ion current detecting circuit. This system has a band pass filter (BPF) for rejecting a noise component and for detecting a high frequency component indicative of an occurrence of engine knock. A fundamental, first harmonic, component indicative of knock may appear in the same frequency range, but aflame noise also appears in the same frequency range. To reject flame noise, the prior system detects harmonic components higher than 10 kHz that include second harmonics of the knock signal.

SUMMARY OF THE INVENTION

Referring to FIG. 5, anion current when knock occurs is indicated by solid line 2, and ion current including a flame noise component is indicated by double dashed line 1. The first harmonic component indicative of knock is detected in the 5 to 7 kHz range, but the flame noise thereat has almost the same level. The second harmonic component indicative of knock is detected in the 10 to 14 kHz range, and here the flame noise is almost negligible. However, the ion current level varies in accordance with circuit arrangement or components of the ignition system.

For instance, the prior system has an ignition coil and a switching device that turns off primary current to induce secondary current in a secondary coil. This system needs relatively high inductance in order to induce sufficient energy on the secondary coil. But, on the other hand, the higher inductance reduces ion current level in a high frequency range. Therefore, it is difficult to achieve both sufficient ignition energy and high ion current sensitivity.

It is an object of the present invention to increase ion current level over a wide frequency range.

It is another object of the present invention to improve accuracy for detecting knock based on ion current.

According to a first aspect of the present invention, an ignition system with an ion current detecting circuit has an ignition circuit that has an energy accumulating coil, and an ignition coil. Therefore, it is possible to reduce inductance of a secondary coil in the ignition coil. The lower inductance secondary coil allows a greater ion current on a wider frequency range. Therefore it is possible to improve an ion current level. The ion current detecting circuit including an ion current detecting means, an extracting means and a detecting means can detect the knock accurately.

The ion current detecting circuit may extract a higher harmonic component. Since the ion current level on a higher frequency is increased, it is possible to detect the knock based on the higher harmonic component.

A current path where the current detected by the current detecting means flows may have a resonance frequency that substantially coincides with a frequency that is extracted by the extracting means. It is possible to improve the ion current level on the frequency to be extracted.

The secondary coil may have inductance less than 10 henries (H) to achieve a sufficient improvement.

The ignition circuit may have a control circuit which drives the first and second switching devices so as to provide a multi-spark ignition. It is possible to achieve a sufficient energy for an ignition sequence.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
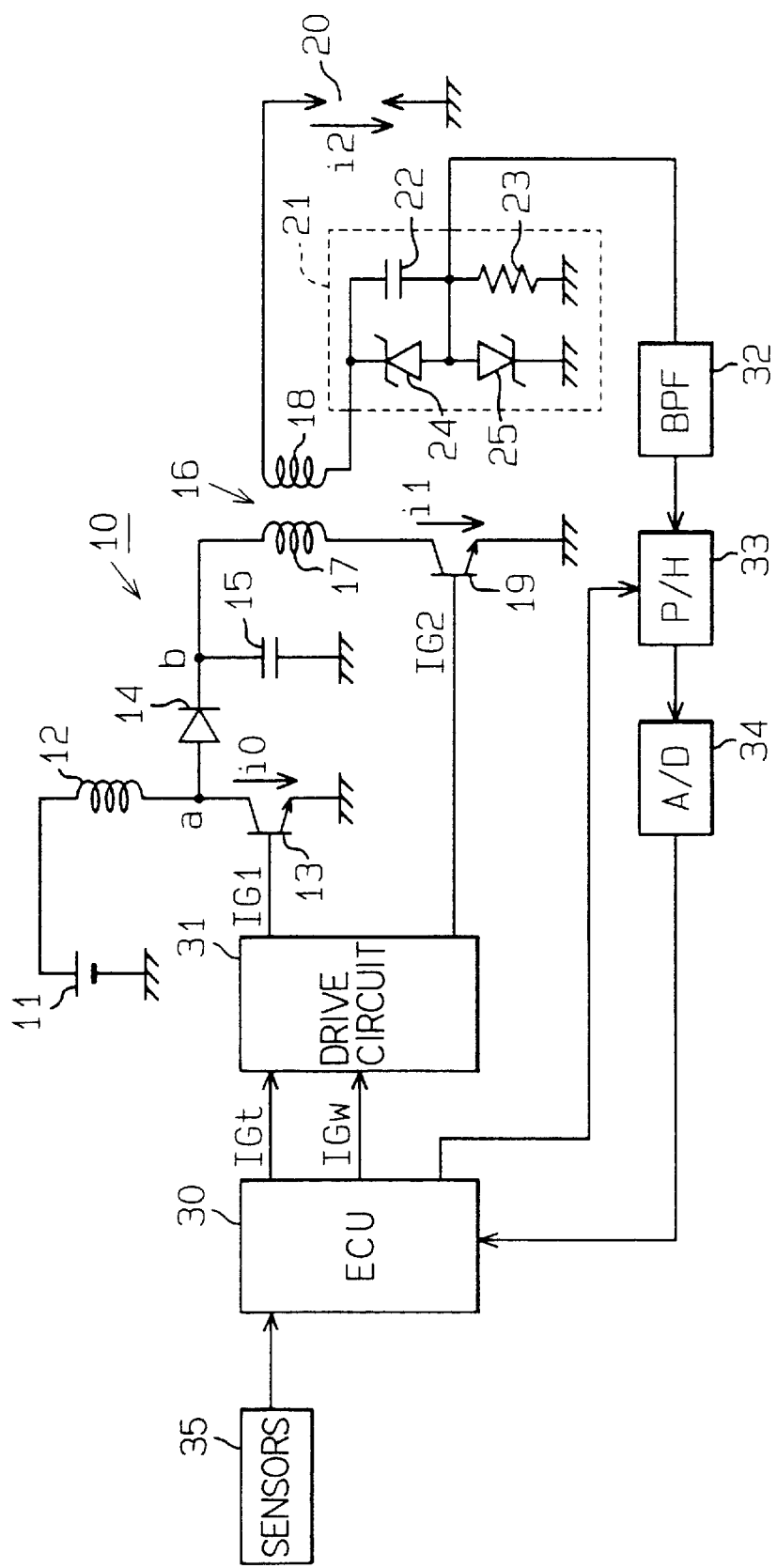
FIG. 1 is a block diagram of an ignition system with an ion current detection circuit for an internal combustion engine of a vehicle in accordance with a first embodiment of the present invention.

An exemplary embodiment of the present invention is explained with reference to the drawings. In this embodiment, the present invention is applied to an ignition system for a vehicular internal combustion engine. The ignition system is a so-called distributor-less ignition DLI) system. FIG. 1 shows a unit for one cylinder of the engine. An actual system has a plurality of components corresponding to each cylinder of the engine (except for an ECU and a driver circuit which typically may be shared components).

An ignition system 10 is connected to a battery 11 as a DC power source. A series connected energy accumulating coil 12 and a transistor 13 is connected between positive and negative terminals of the battery. The energy accumulating coil 12 accumulates energy in accordance with the current that flows when transistor 13 turns on and closes the series circuit. The current flowing through the energy accumulating coil 12 is denoted by i0. An anode terminal of a diode 14 is connected to a point "a" located between the energy accumulating coil 12 and the transistor 13. A cathode terminal of the diode 14 is connected to a terminal of a condenser 15. The other terminal of the condenser 15 is grounded. Therefore, a series circuit of the diode 14 and the condenser 15 is connected in parallel to the transistor 13. The condenser 15 is charged with an accumulated energy in the energy accumulating coil 12 when the transistor 13 is turned off. The transistor 13 is disposed as a first switching device.

An ignition coil 16 has a primary coil 17 and a secondary coil 18. The primary coil 17 is connected with the transistor 19 in series. The primary coil 17 and the transistor 19 are connected in parallel with the condenser 15 via a point "b". According to the arrangement, a primary current i1 flows through the primary coil 17 when the transistor 19 is turned on. The transistor 19 is disposed as a second switching device. In this embodiment, the circuit components 12, 13, 14, 15, 16, and 19 provide an ignition circuit for generating a spark on the spark plug.

One terminal of secondary coil 18 is connected to spark plug 20. The secondary coil 18 induces a high voltage in response to a primary current change, provides a spark in the spark plug 20, and supplies a secondary current i2 when an air gap breaks down. The other terminal of secondary coil 18 is connected to an ion current detecting circuit 21. The ion current detecting circuit 21 detects ion current caused by supplying voltage to the spark plug, and outputs a signal indicative of ion current by converting the ion current level into a voltage drop across a resistor. The ion current detecting circuit 21 has a condenser 22 for supplying voltage to spark plug 20, a resistor 23, and a pair of zener diodes 24 and 25. The resistor 23 generates a voltage drop corresponding to the ion current level. The pair of zener diodes 24 and 25 is disposed for controlling a charging current path and an ion current path, and for regulating voltages.

Figure 5:
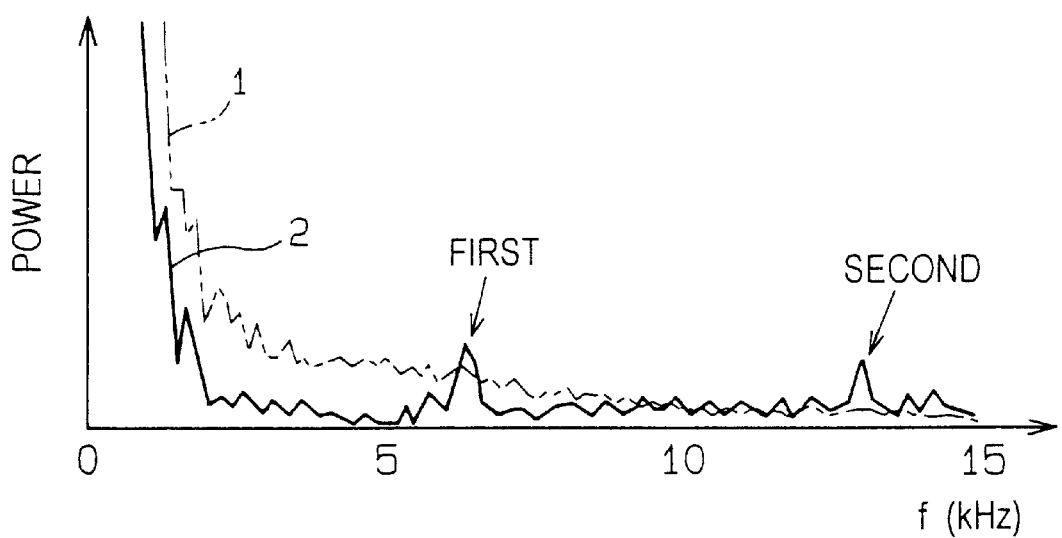
FIG. 5 is a graph showing power of an ion current with respect to a frequency.

A band pass filter (BPF) 32 is connected with the ion current detection circuit 21 for rejecting a noise signal and detecting a signal indicative of a knock. The BPF 32 is disposed as an extracting means for extracting and outputting a component indicative of a knock. A peak hold circuit (P/H) 33 is connected with the BPF 32 for holding a peak value detected by the BPF 32 within a gate period that is indicated by an electronic control unit (ECU) 30. An A/D converter 34 is connected with the P/H 33 for inputting a peak value into the ECU 30 held by the P/H 33. Here, a knock frequency where a vibration caused by the knock is maximized is affected by several parameters such as a profile of the combustion chamber, and a volume therein. Generally, a first harmonic component may be detected on a frequency range from 5 to 7 kHz as shown in FIG. 5. A second harmonic component may be detected on a frequency range from 10 to 14 kHz as shown in FIG. 5. The BPF 32 is set to pass the second harmonic component of the knock. The P/H 33 is controlled so as to hold a peak value in a period of time just after an ignition sequence in order to reject noise components.

The ECU 30 inputs sensor signals indicative of an engine condition and a vehicle condition from sensors 35 such as an intake air amount, an engine speed and a coolant water temperature. The ECU 30 determines adequate ignition timing in accordance with the engine and vehicle conditions, and outputs control signals IGt and IGw. A drive circuit 31 is disposed between the ECU 30 and the transistors 13 and 19 for converting the control signals IGt and IGw into driving signals IG1 and IG2 for the transistors 13 and 19. The signal IGt is an ignition timing signal that indicates a start of an ignition sequence and a beginning of a multi-spark ignition. The signal IGw is an ignition period signal that indicates a period of time for continuing the multi-spark ignition. The ECU 30 evaluates a signal from the A/D converter 34 and determines that whether or not a knock is detected. Then, the ECU 30 executes a correction procedure for preventing the knock. For example, the ECU 30 retards the ignition timing signal IGt to prevent the knock. In this embodiment, the ECU 30 and the drive circuit 31 provides a control circuit for driving the transistors 13 and 19.

Figure 2A:
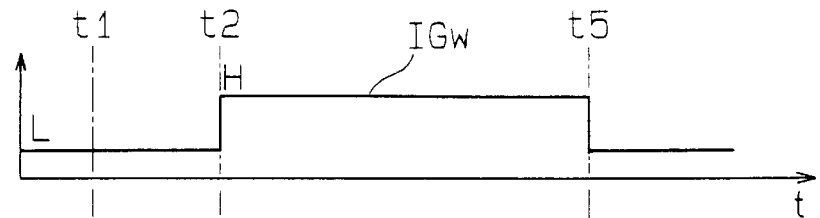
FIGS. 2A through 2G are time charts showing an ignition operation in accordance with the first embodiment of the present invention.
Figure 2B:
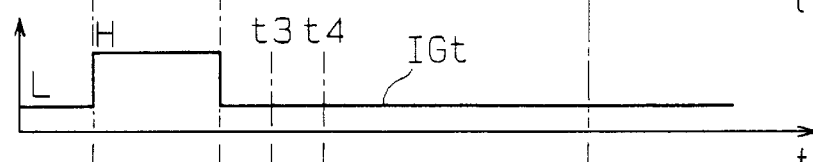
Figure 2C:
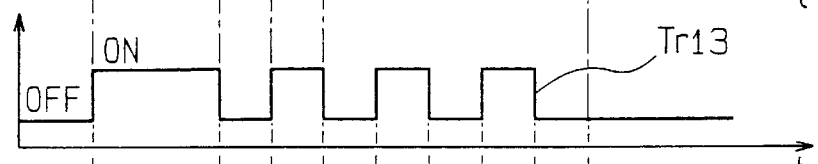
Figure 2D:
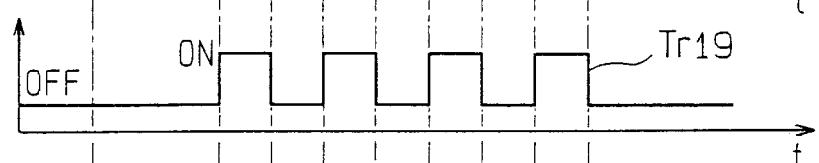
Figure 2E:
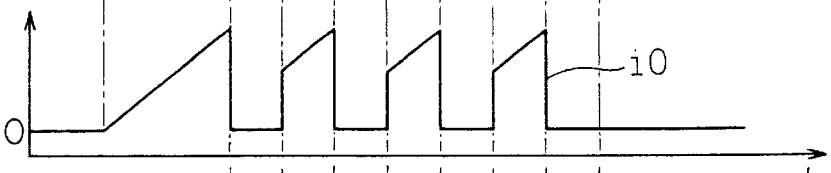
Figure 2F:
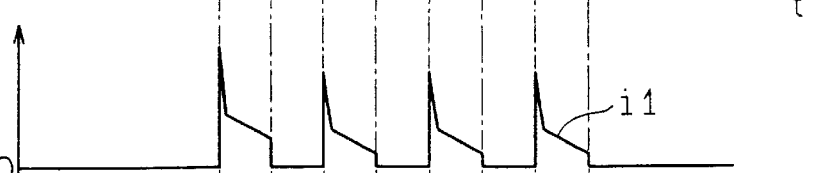
Figure 2G:
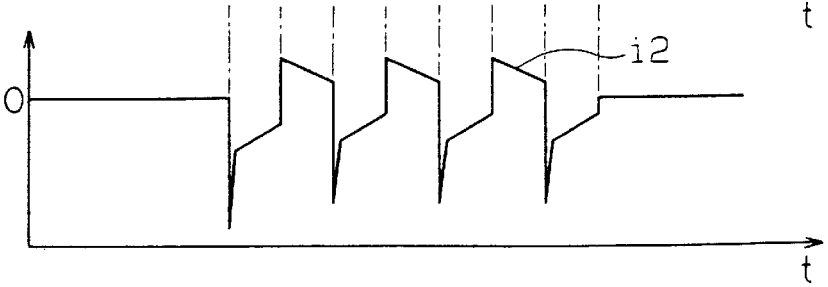

FIG. 2A shows the ignition period signal IGw. FIG. 2B shows the ignition timing signal IGt. FIG. 2C shows a driving signal IG1 for the transistor 13. FIG. 2D shows a driving signal IG2 for the transistor 19. FIG. 2E shows the current i0 flowing the energy accumulating coil 12. FIG. 2F shows the primary current i1. FIG. 2G shows the secondary current i2.

The ECU 30 turns on the signal IGt at t1. The drive circuit 31 generates the signal IG1, and turns on the transistor 13 in response to a leading edge of the signal IGt. The current i0 gradually increases as the energy accumulating coil 12 accumulates the magnetic energy. Then, the signal IGt is turned off, simultaneously the signal IGw is turned on at t2. Simultaneously, the transister 13 is turned off and the transistor 19 is turned on. The accumulated energy in the energy accumulating coil 12 and the condenser 15 provides a large spike on the primary current i1 in response to the switching of the transistor 13 and 19. The ignition coil 16 induces a high voltage on the secondary coil 18 and generates a spike on the secondary current i2 at t2. As a result, a first spark is generated on the spark plug 20.

The signal IGw is maintained high level for a period of time determined by the ECU 30. For example, the signal IGw is maintained from t2 to t5 that is long enough to generate a multi-spark on the spark plug 20. During the period indicated by the signal IGw, the transistors 13 and 19 are periodically turned on and off in an opposed manner. In a period between t2 and t3, the transistor 19 is turned on, and the ignition coil 16 accumulates a magnetic energy. Then, the drive circuit 31 turns on the transistor 13 and turns off the transistor 19 at t3. At this time, the magnetic energy accumulated in the ignition coil 16 generates a high voltage on the secondary coil 18, and a second spark is generated on the spark plug 20.

The energy accumulating coil 12 begins to accumulate a magnetic energy at t3. Then, the drive circuit 31 turns off the transistor 13 and turns on the transistor 19 at t4. Therefore, the ignition coil 16 provides a third spark on the spark plug 20. The ignition circuit repeats the above-described operation for several times determined by the signal IGw. As a result, the multi-spark is provided during the period of time determined by the signal IGw. The ECU 30 turns off the signal IGw at t5 to complete the multi-spark ignition sequence.

After that, the ion current detecting circuit 21 measures the ion current. The ECU 30 controls the P/H 33 to sample the ion current signal just after the multi-spark ignition sequence. The condenser 22 is charged with a negative voltage during the spark. The charged electricity in the condenser 22 is discharged through the spark plug 20 if ionized gas is formed in the combustion chamber, and the ion current flows. The ECU 30 compares a peak value sampled by the P/H 33 with a predetermined threshold value. If the engine has a knock, the ion current varies in response to a vibration of a pressure in the cylinder caused by the knock. The ECU 30 detects the knock when the detected peak value is greater than the predetermined threshold value. In this embodiment, the ECU 30 detects the knock based on the second harmonic component extracted from the ion current.

Figure 3:
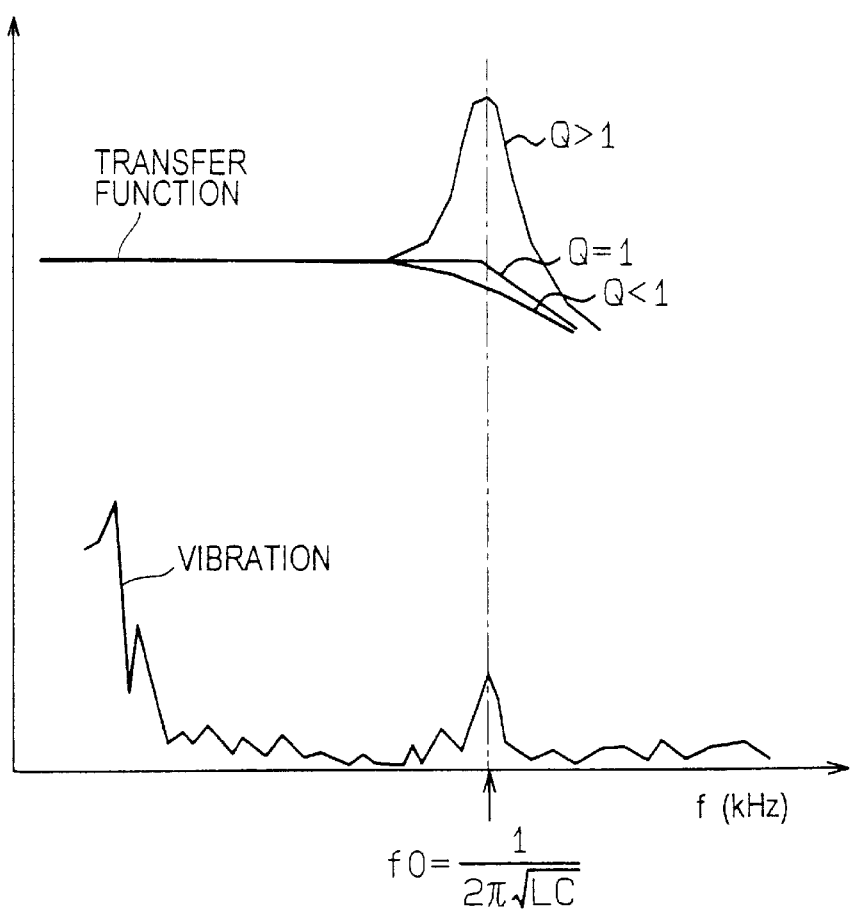
FIG. 3 is a graph showing a response of a transfer function of an ion current circuit and an actual vibration including a knock with respect to a frequency in accordance with the first embodiment of the present invention.

In this embodiment, the spark plug 20, the secondary coil 18, the condenser 22 and the resistor 23 form an ion current path that has a resonance frequency f0. The resonance frequency f0 substantially coincide with a second harmonic frequency of the knock. The resonance frequency f0 may be expressed by $f0 = \frac{1}{2\pi\sqrt{(LC)}}$. Here, L is inductance of the secondary coil 18, and C is whole capacitance of the ion current path. Therefore, value L and value C are set so that the resonance frequency f0 coincides with the second harmonic frequency of the knock. The whole resistance R of the ion current path is set so that a Q-value that indicates a sharpness takes greater than 1 (one). The Q-value is expressed by Q=√ (LC)/R. FIG. 3 shows a relationship among the Q-value, the resonance frequency f0 and a vibration indicative of the knock. By the above-described settings, the ion current path is designed to have a tendency to pass the second harmonic frequency of the knock. As a result, the ion current detecting circuit 21 can provide a sufficient signal level indicative of the knock. In this embodiment, circuit components are designed so that the resonance frequency f0 and Q-value meets above described condition.

Figure 4:
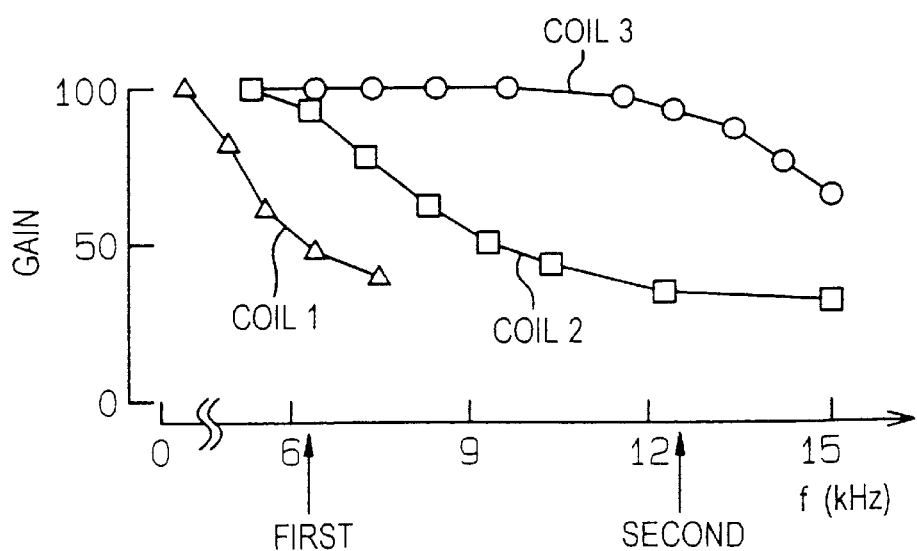
FIG. 4 is a graph showing ion current gains of coils with respect to a frequency.

This embodiment has two coils 12 and 16 for executing the ignition sequence, therefore it is possible to reduce inductance of the secondary coil 18. The low inductance secondary coil 18 improves a response of the ignition coil 16 and increases an ion current level on a high frequency range. Therefore, it is possible to detect the second harmonic component of the knock accurately. FIG. 4 shows ion current gains of several coils. In FIG. 4, a coil 1 denoted by triangle marks is a conventional ignition coil that has relatively high inductance. A secondary coil of the coil 1 has inductance about 20 henries (H). A coil 2 denoted by square marks is a coil that can be used for the multi-spark type ignition system described above. A secondary coil of the coil 2 has inductance about 10 henries (H). There are significant improvements between the coil 1 and the coil 2. The gains are improved from a low frequency to a high frequency including the first and the second harmonic frequencies of the knock. A coil 3 denoted by circular marks is a coil that can be used for the multi-spark type ignition system. A secondary coil of the coil 3 has inductance that is lower than that of the coil 2. Therefore, the gains are further improved and take approximately 100 up to around the second harmonic frequency. This embodiment uses a coil that has inductance between the coil 2 and coil 3, therefore it has inductance less than 10 henries (H). As a result, the embodiment can provide greater gains even on the second harmonic frequency, and can detect the second harmonic component accurately.

According to the embodiment, it is possible to increase the gains for detecting the ion current on a high frequency range, and detect the second harmonic component of the knock accurately. Therefore, it is possible to improve accuracy for detecting the knock based on the ion current. Further, it is possible to avoid lowering an ignition energy by utilizing the multi-spark ignition system, therefore it is possible to achieve both of the improvement of the knock detection accuracy and a high energy ignition.

Further, since the resonance frequency f0 is substantially coincide with the second harmonic frequency of the knock, it is possible to improve sensitivity of the circuit to the knock, and improve the knock detection accuracy.

Alternatively, the present invention may be applied for an ignition system with a knock detection circuit that detects at least one harmonic component other than the second harmonic component such as a first, third or fourth harmonic component of the knock. By using the embodiment described above, it is possible to improve the ion current detection sensitivity over a wide frequency range from the first harmonic frequency to higher harmonic frequencies as shown in FIG. 4. Further, the present invention may extract signal components within 5 to 14 kHz range. Although the extracted components may include both the first and the second harmonic components, the knock detection accuracy is improved. Since it has been ascertained that the first harmonic component may be detected in 10 to 14 kHz range in some of engines, an extracting frequency range should be adapted to the engine.

Alternatively, an independent direct current source can be used instead of the condenser based voltage source. Further, an AC power source disposed on the primary side of the ignition coil can be used instead of the condenser based voltage source. The AC power source generates an AC voltage on the secondary coil that can flow the ion current via the spark plug. Such independent power source for supplying a voltage on a spark plug can be connected with a circuit including the spark plug only when the ion current is subjected to detect. A high voltage switching device may be used between the ignition coil and the spark plug for switching the circuit to connect the independent power source.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An ignition system with an ion current detecting circuit, the system comprising:

an ignition circuit that has an energy accumulating coil, a first switching device disposed in series to the energy accumulating coil for controlling a current therethrough, an ignition coil having a primary coil disposed in parallel to the first switching device and a secondary coil that supplies a secondary current to a spark plug, and a second switching device disposed in series to the primary coil for turning on and off a primary current therethrough;

a current detecting means for detecting a current flowing through the spark plug and outputting a signal indicative of the detected current;

an extracting means for extracting a component within a specific frequency range from the signal detected by the current detecting means; and a knock detecting means for detecting the knock based on the component extracted by the extracting means.

2. The ignition system with the ion current detecting circuit according to claim 1, wherein the extracting means extracts the component including a higher harmonic component indicative of the knock.

3. The ignition system with the ion current detecting circuit according to claim 1, wherein the extracting means extracts a component at least within 10 to 14 kHz.

4. The ignition system with the ion current detecting circuit according to claim 1, further comprising a current path where the current detected by the current detecting means flows, the current path has a resonance frequency that substantially coincides with a frequency that is extracted by the extracting means.

5. The ignition system with the ion current detecting circuit according to claim 1, wherein the secondary coil has inductance less than 10 henries (H).

6. The ignition system with the ion current detecting circuit according to claim 1, further comprising a control circuit which drives the first and second switching devices so as to provide a multi-spark ignition.

7. The ignition system with the ion current detecting circuit according to claim 6, wherein the control circuit drives the first and second switching devices so that the switching devices turn on and off periodically in an opposed manner.

8. The ignition system with the ion current detecting circuit according to claim 7, wherein the ignition circuit further comprises a condenser disposed in parallel with the first switching device.

9. An ignition system with an ion current detecting circuit for an engine, comprising:

an ignition circuit which has an ignition coil and a driving circuit for driving the ignition coil according to a multi-spark ignition sequence; and an ion current detecting circuit for detecting an ion current indicative of a knock of the engine, wherein the ignition coil has inductance less than 10 henries (H), and the ion current detecting circuit detects at least a component of the ion current that has a second or higher harmonic frequency of the knock.

10. The ignition system with the ion current detecting circuit for the engine according to claim 9, wherein components providing the ignition circuit and the ion current detecting circuit are designed so that a current path where the ion current flows has a resonance frequency that substantially coincides with the second or higher harmonic frequency detected by the ion current detecting circuit.

11. The ignition system with the ion current detecting circuit for the engine according to claim 9, wherein components providing the ignition circuit and the ion current detecting circuit are designed so that a Q-value of the current path is greater than 1.

12. An ignition system comprising:

a repetitively switched energy accumulating circuit including an energy storage reactance element for storing energy from a battery in synchronism with operation of a first repetitively controlled switch;

an ignition coil having a primary winding connected between said energy accumulating circuit and a second repetitively controlled switch;

said ignition coil also having a secondary winding connectable to an ignition spark plug;

a frequency-selective ion current detector connected to detect ion current in a predetermined frequency band passing through the ignition spark plug at a predetermined time during a combustion cycle.

13. An ignition system as in claim 12 wherein said primary winding has inductance of less than 10 henries (H).

14. An ignition system as in claim 13 wherein said predetermined frequency band corresponds to an expected second or higher harmonic of ion current indicative of engine knock.

15. A method for achieving spark-induced ignition in an engine combustion chamber so as to enhance detection of ion currents indicative of engine knock, said method comprising:

repetitively switching an energy accumulating circuit including an energy storage reactance element to periodically store energy from a battery in synchronism with operation of a first repetitively controlled switch;

also synchronously repetitively switching an ignition coil primary winding connected between said energy accumulating circuit and a second repetitively controlled switch thereby inducing spark-induced combustion in a combustion chamber via an ignition spark plug connected to an ignition coil secondary winding; and detecting ion current in a predetermined frequency band passing through the ignition spark plug at a predetermined time during a combustion cycle.

16. A method as in claim 15 wherein said primary winding has an inductance of less than 10 henries (H).

17. A method as in claim 16 wherein said predetermined frequency band corresponds to an expected second or higher harmonic of ion current indicative of engine knock.

* * * * *